Aug. 11, 1959    A. THAON DE SAINT-ANDRÉ    2,899,086
GARAGES FOR PARKING CARS AND IN
PARTICULAR AUTOMOBILE VEHICLES
Filed Jan. 17, 1957    4 Sheets-Sheet 1

INVENTOR
André Thaon de Saint-André
BY
Brown & Seward
ATTORNEYS

INVENTOR
André Thaon de Saint-André
BY
Brown + Seward
ATTORNEYS

Aug. 11, 1959    A. THAON DE SAINT-ANDRÉ    2,899,086
GARAGES FOR PARKING CARS AND IN
PARTICULAR AUTOMOBILE VEHICLES

Filed Jan. 17, 1957            4 Sheets-Sheet 3

INVENTOR
André Thaon de Saint-André
BY
Brown & Seward
ATTORNEYS

Aug. 11, 1959  A. THAON DE SAINT-ANDRÉ  2,899,086
GARAGES FOR PARKING CARS AND IN
PARTICULAR AUTOMOBILE VEHICLES

Filed Jan. 17, 1957  4 Sheets-Sheet 4

INVENTOR
André Thaon de Saint-André
BY
Brown & Seward
ATTORNEYS

United States Patent Office 2,899,086
Patented Aug. 11, 1959

2,899,086

GARAGES FOR PARKING CARS AND IN PARTICULAR AUTOMOBILE VEHICLES

André Thaon de Saint-André, Montreux-Clarens, Switzerland

Application January 17, 1957, Serial No. 634,789

Claims priority, application Switzerland January 20, 1956

10 Claims. (Cl. 214—16.1)

The present invention relates to garages for parking cars and in particular automobile vehicles.

The chief object of my invention is to provide a garage of this kind which is better adapted to meet the requirements of practice than those existing at the present time, and in particular which permits a considerable saving in room and time.

Preferred embodiments of my invention will be hereinafter described with reference to the accompanying drawings, given merely by way of example and in which.

Figure 5:
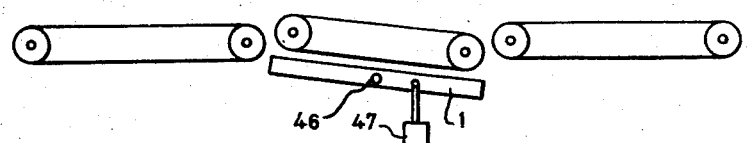

Fig. 5 diagrammatically shows a swinging platform.

Figure 1:
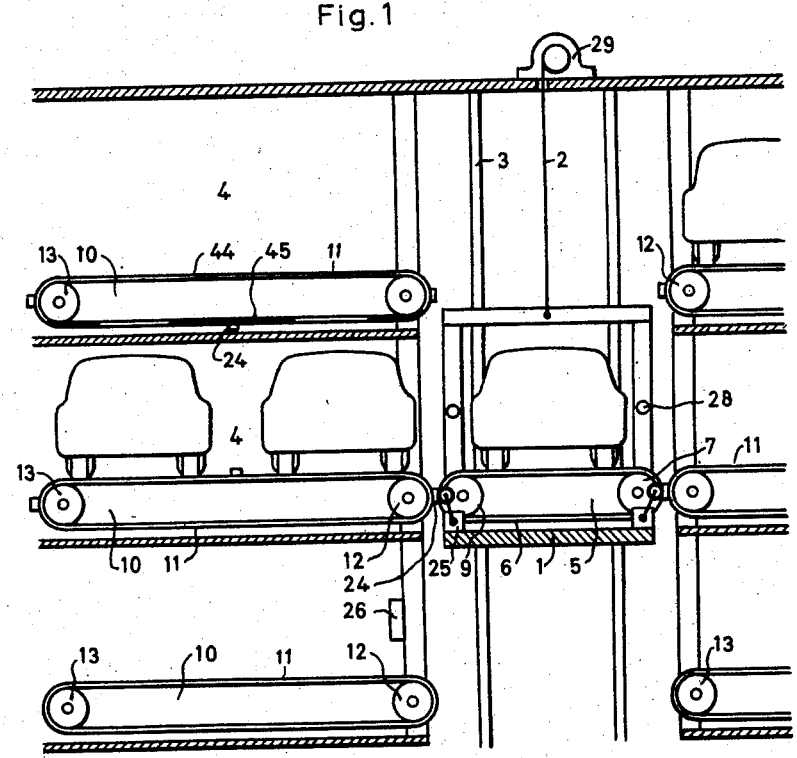
Fig. 1 is an elevational view of a parking garage made according to an embodiment of my invention.
Figure 2:
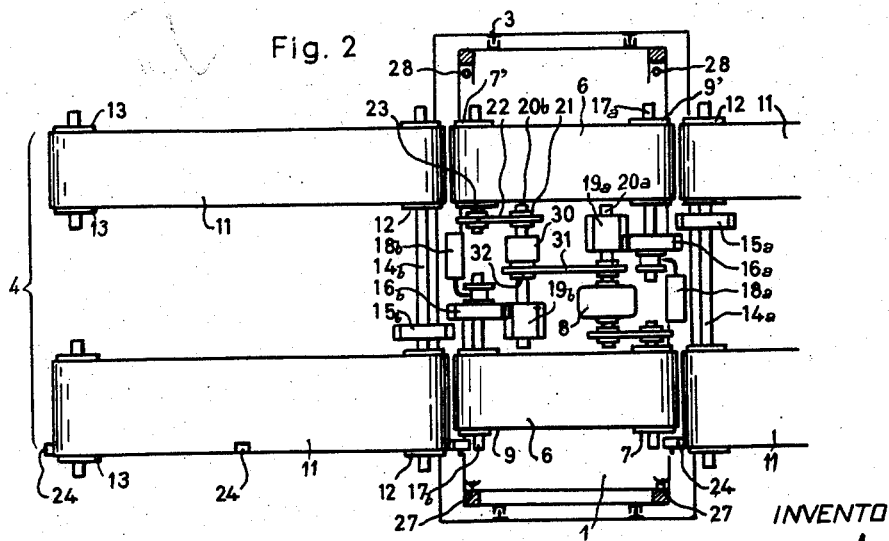
Fig. 2 is a plan view corresponding to Fig. 1.
Figure 6:
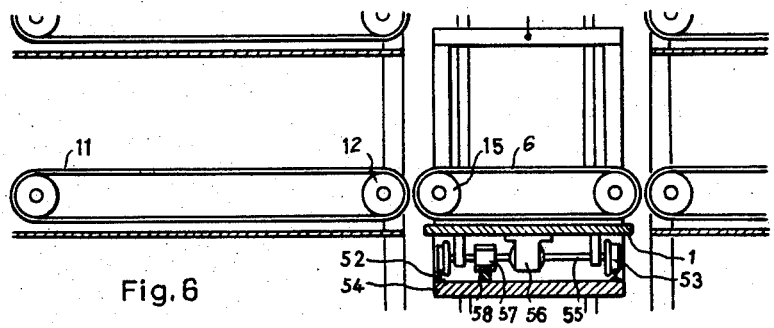
Figure 7:
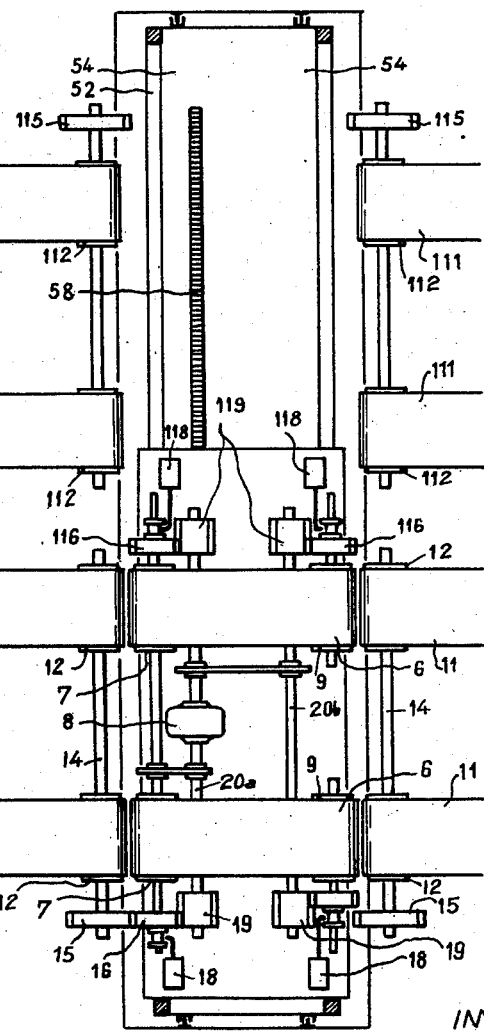

Figs. 6 and 7 are views similar to Figs. 1 and 2 respectively, and illustrate another embodiment of my invention.

Figure 8:
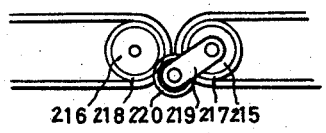
Figure 9:
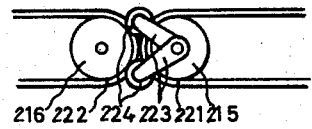

Figs. 8 and 9 are diagrammatical views showing, in elevation, transmission systems to be interposed between a platform conveyor and a parking area conveyor.

Figure 10:
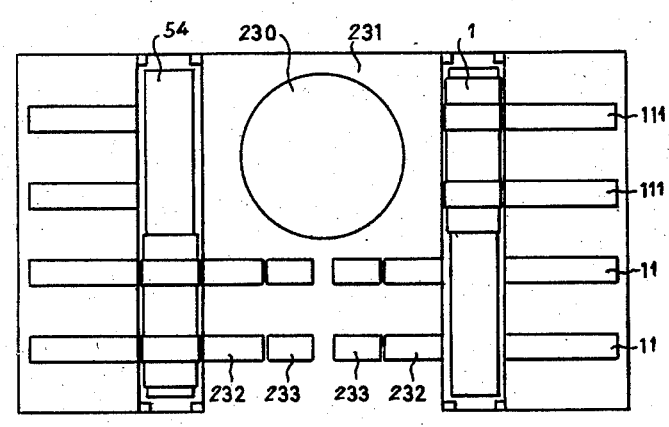

Fig. 10 is a plan view of the ground floor of a parking garage according to my invention.

Figure 11:
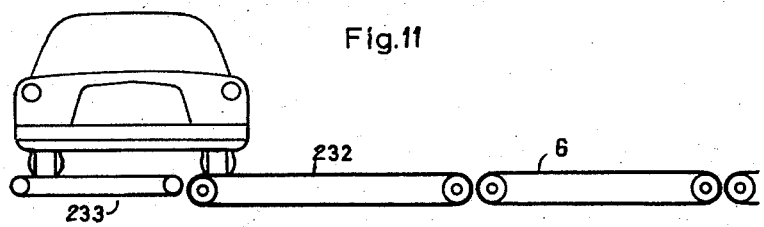

Fig. 11 is an elevational view of a conveyor system to be used in connection with the arrangement of Fig. 9.

Figure 12:
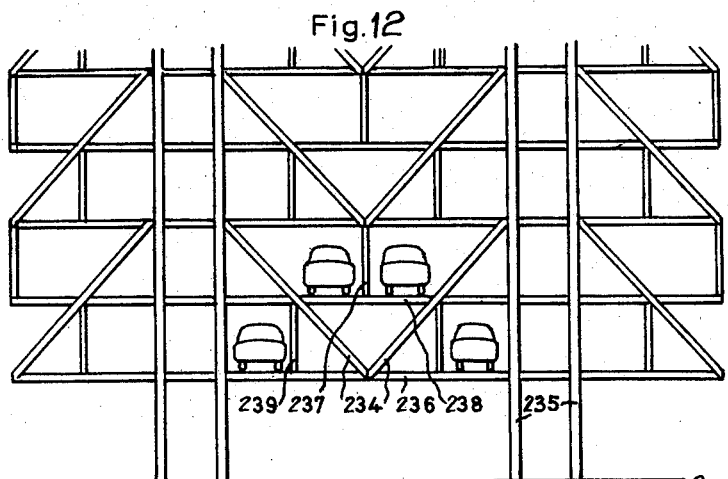

Fig. 12 is an elevational view of the framework of a parking garage according to my invention.

The parking garage illustrated by Figs. 1 and 2 includes a plurality of floors or levels each of which comprises, on either side of an elevator shaft, a parking area 4 which, in this embodiment of my invention, comprises two stalls.

The platform 1 of the elevator is supported by a cable 2 and guided by vertical guiding members 3 between said parking areas 4.

Platform 1 includes two endless belt conveyors 5 each of which supports an axle of a car.

Each conveyor 5 includes an endless belt 6, a drum 7 or 7′ which drives this endless belt and a drum 9 or 9′ mounted on a shaft 17b or 17a. A single electric motor 8 carried by platform 1 drives the drums 7, 7′ of the two conveyors.

In a likewise manner, every parking area 4 comprises two endless belt conveyors 10 located in line with the respective conveyors 5 of the platform when said platform is stopped opposite said parking area. Every conveyor 10 includes an endless belt 11 passing on a drum 12 located along the edge of the elevator shaft and a drum 13 located at the other end of the parking area.

The two drums 12 which drive the respective endless belts 11 of the two conveyors 10 of a parking area 4 are each fixed on a shaft 14a, 14b on which are keyed wheels 15a, 15b.

Sliding gears 16a, 16b intended to mesh with said gear wheels 15a, 15b are mounted on each shaft 17a, 17b so as to be free to rotate and to slide along said shaft (on which are mounted the drums 9′ or 9 respectively of the platform conveyor). An electro-magnet 18a or 18b controls the sliding displacements of each of said gears 16a, 16b so as to bring it into mesh with the corresponding gear wheel 15a or 15b.

Each sliding gear 16a, 16b is constantly in mesh with a pinion 19a, 19b mounted on the end of a shaft (20a on one side of platform 1, 20b on the other side) which drives it and is itself driven by motor 8. Shaft 20b further carries at its other end a sprocket wheel 21 which drives, through a chain 22, a sprocket wheel 23 rigid with the drum 7′ which drives the conveyor which is not directly driven by motor 8. As the driving drums 7, 7′ are diagonally opposed on the platform, the same as the driven drums 9, 9′ each shaft, 20a or 20b, controls, at one end thereof, one conveyor 5 and, at the other end (provided that the corresponding sliding gear 16a, 16b is in mesh with the gear wheel 15a, 15b with which it is to cooperate), the conveyors 10 of the parking area 4 located on the same side of the platform.

One of the endless belts 11 of every parking area 4 is wider than the platform endless belt 6 located in line with it, and the projecting edge of said belt 11 carries fingers or blocks 24 arranged to operate, when they are located at the middle point of the arc along which the endless belt passes round drum 12, a switch 25 carried by platform 1 and which controls motor 8.

Figure 3:
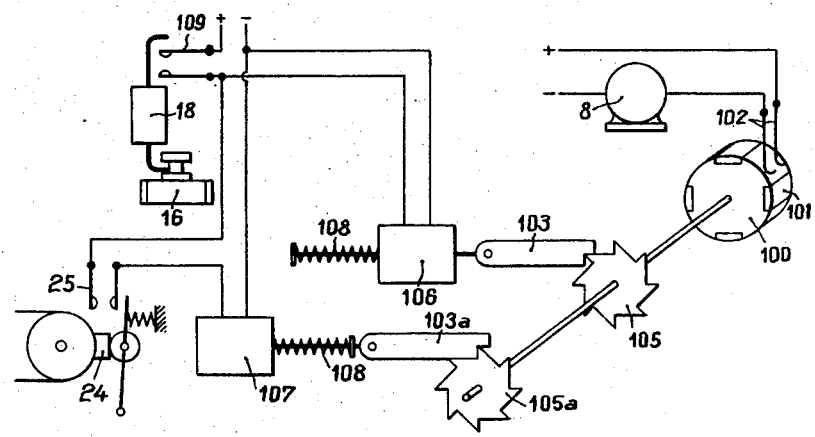
Fig. 3 is a diagrammatical view of a detail of the system of Figs. 1 and 2.

The device for controlling the operation of said motor 8 is shown separately by Fig. 3.

The electric circuit of said motor 8 is controlled by a drum 100 carrying four conductor strips 101 located at 90° to one another, said conductor strips cooperating with two contacts 102 inserted in the circuit of motor 8. Drum 100 is given angular displacements equal to one eighth of a circumference under the effect of pawl bars 103 and 103a cooperating with ratchet wheels 105 and 105a fixed on the shaft of drum 100. Strips 101 close the circuit of motor 8 when they are located under contacts 102. One elementary rotation of drum 100 (through one eighth of a revolution) brings a non conductor portion of drum 100 under contacts 102 and therefore opens the circuit of motor 8. The next elementary rotation of drum 100 will close said circuit of motor 8. The movement of pawl bars 103 and 103a are respectively controlled by electro-magnets 106 and 107 provided with return springs 108 and arranged in such manner that electro-magnet 106 causes drum 100 to rotate when electric current is fed to said electro-magnet, whereas electro-magnet 107 causes drum 100 to rotate when the current through said electro-magnet 107 is cut off, and the corresponding pawl bar 103a is actuated by spring 108.

When the electro-magnet 18a or 18b which controls the sliding gear 16a or 16b is energized, it closes a switch 109 and current is therefore fed to switch 25 (which is then kept open by finger 24) and to electro-magnet 106 which causes drum 100 to rotate into the position where it closes the circuit of motor 8. As soon as finger 24 leaves switch 25, said switch is closed and current passing through switches 109 and 25 is fed to electro-magnet 107 which moves bar 103a rearwardly against direction of its spring 108. When the next finger 24, carried by the belt 10 of conveyor 11, comes into the position shown by Fig. 3, it opens switch 25 so that electro-magnet 107 is no longer fed with current, and spring 108 moves pawl bar 103a into the direction which rotates drum 100. Motor 8 is then stopped. Electro-magnet 18a or 18b and therefore sliding gear 16a or 16b are controlled through another electric circuit independent of that of motor 8.

With such an arrangement, closing of the switch 25 remains without effect as long as the sliding gear 16a or 16b that is located on the same side of the platform is not in mesh with the corresponding gear 15.

Therefore every elementary displacement of conveyor 10 is stopped for a position of said conveyor which is always the same, since it is controlled by the action of fingers 24. A car, transferred by the conveyor from the platform to the parking area 4, is therefore always stopped exactly in the same position with respect to said parking area and to said platform.

In the preferred embodiment of my invention, there are two stalls in every parking area. Of course, it may happen that a car which has been first stored in a parking area, that is to say which occupies the stall the more remote from the elevator shaft, is to be departed when there is another car in the other stall of said parking area. This necessitates transferring the second mentioned car into another stall. As this shifting operation may be performed several times for the same car, it is advantageous to have said car always correctly positioned and this necessitates equality of the elementary displacements that are to be performed in every parking area. For this reason, the distances between successive stopping blocks or fingers 24 are to be equal along the endless belt 11 which carries them.

When the system is wholly automatic and there is nobody on the platform, the operations being controlled from the ground floor by means of a control switch board 26, it may be feared that a car is gradually more and more offset with respect to the platform in the course of successive shiftings. This might give rise to a serious accident. It is therefore advantageous to provide on the platform two photo-electric cells 27 which receive longitudinal light beams from two light sources 28, said photo-electric cells and light sources being respectively located at the four corners of platform 1 so as to leave between them, on the platform, a free space to be occupied by cars coming from, or moving toward, the parking areas. The light beams from sources 28 are horizontal, longitudinal, and located substantially at the level where motor cars are of the maximum width and the distance between the two light beams is greater than the maxmium width of the biggest cars to be parked.

The electrical equipment is arranged in such manner that the motor 29 of the elevator cannot be started if one of the light beams of sources 28 is cut off by a car which is of the wrong position. Pilot lamps disposed on the switch board indicate which beam is cut off, and this permits of correcting the position of the car, the sliding gears 16 being then disengaged from gear wheels 15.

In view of the fact that a car which is shifted several times may gradually assume an oblique position, I provide an electro-magnetic clutch in order to make the two platform conveyors 5 independent of each other. For instance, shaft 20b being driven by motor 8 through a chain 31 and a gear wheel 32, the electro-magnetic clutch 30 will be interposed between said shaft 20b and gear wheel 32. This permits of operating only one conveyor (the one driven by shaft 20a) and to rectify the position of the car by moving said conveyor in the proper direction.

The conveyors of the ground floor are not provided with automatic stopping means as above described (fingers 24 and switches 25) because such means would have no utility on said floor. But, on the contrary, it is very interesting automatically to center every car on the platform in the transverse direction. For this purpose, I may use in the following manner the photo-electric cell 27 located on the side from which the car enters the platform.

Figure 4:
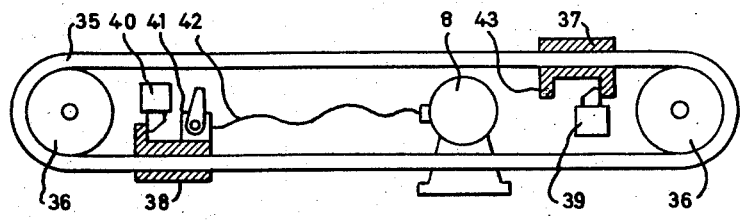
Fig. 4 is a diagrammatic elevational view of a device for automatically setting a car in central position on a platform.

According to the arrangement illustrated by Fig. 4, an endless chain 35 passing round two gear wheels 36, respectively coaxial and rigid with drums 7 and 9, is synchronized with the endless belts 6, that is to say with the displacements of the car. Two sliding members 37 and 38 move with a slight friction respectively on the upper and lower portions of chain 35 and are returned into the vertical plane of the light beams by a known device, not shown in the drawing, every time the elevator is moving upwardly or downwardly. Sliding member 37, located on the side on which the car is entering the platform, is retained by an electro-magnet 39 which is released when the photo-electric cell 27 is no longer energized. Sliding member 38, located below and on the opposite side, is retained by an electro-magnet 40 which is released when the same photo-electric cell is again energized.

Sliding member 38 carries a switch 41 which is connected with motor 8 by a flexible electric wire 42 and sliding member 37 carries a finger 43 arranged so as to operate switch 41 when the two sliding members come into the same vertical plane.

In these conditions, when the car cuts off the light beam, sliding member 37 is released and moves exactly in the same manner as the car and in fact represents one side thereof. When the car has been wholly engaged on the platform and ceases to cut off the light beam, sliding member 37 has moved a distance equal to the width of the car and is located at a distance of sliding member 38 equal to twice the distance to be travelled over for having the car correctly centered. Sliding member 38 is then released and the two sliding members move toward each other, so that finger 43 operates switch 41 and stops the motor 8 just at the time the car is correctly centered on the platform.

With arrangements such as above described, the wheels of the cars are always resting on the same portions of the endless belts, said portions being limited in the direction of the transverse displacements of the car in accordance with the smallest and largest track dimensions of the various cars to be parked. In these conditions, I may make use of discontinuous endless belts constituted for instance by endless chains 44 carrying three supporting areas 45 extending between said chains, the remainder of the chains serving merely to pull the endless belt supporting areas.

Many modifications are of course possible. In particular, the elevator cage in which moves the platform may be made movable, in a direction parallel to the cars, said platform being supported by a carriage located either above or below it, in such manner that the platform can cooperate with all the parking areas of two groups disposed opposite each other on either side of the elevator, and each of which comprises several contiguous parking areas. In this case, the horizontal displacements of the cage should be effected when the platform is between two floors so as to avoid any interference between the gear wheels 15 and 16.

In order to facilitate the passage of cars from the platform to the parking areas, and from the parking areas to the platform, it may be of advantage to establish the means for stopping the platform at a given floor in such manner that there are two stopping positions with relatively large tolerances but such that one position is systematically below the level of the floor and the other systematically above. The choice between the two positions depends upon the nature of the operation to be performed. The lower level is chosen for a car which is to enter the platform and the upper level for a car which is to leave said platform.

According to the arrangement illustrated by Fig. 5, platform 1 may be mounted on two end pivots 46 in line with each other and disposed along the longitudinal axis of said platform. It is then possible to incline the platform slightly in one direction or the other, this pivoting displacement being automatically controlled by known means, such for instance as an electro-magnet 47. The advantage is then to have to provide for only one stopping position at every floor, while being able to shift a car from one parking area to the parking area located on the other side of the platform by first pivoting the platform about its axis in one direction in order to facilitate the passage of the car from the parking area to the platform and then pivoting the platform in the opposed direction to facilitate the passage of the car from the platform to the other parking area. Such a displacement of the platform is compatible with a good meshing of gear wheels 15 and 16 provided that the shape of the teeth of said gear wheels is suitably chosen.

In the embodiment of my invention illustrated by Figs. 6 and 7, the elevator floor or frame 54 is provided with longitudinal rails 52 on which are running wheels 53 which support platform 1. The axle 55 of one of the pairs of wheels 53 is driven by a motor 56 carried by platform 1, and this axle carries, fixed thereon, a gear wheel 57 in mesh with a rack 58 fixed on the elevator floor 54.

In this construction, there are two parking areas 4 and 104 on each side of the elevator floor 54 and the endless belts 6 of platform 1 can be made, by suitably positioning said platform 1 along its rails 52, to cooperate either with the endless belts 11 of parking area 4 or with the endless belts 111 of parking area 104.

The means for driving the belts are similar to those above described with reference to Figs. 1 and 2, and are designated by the same reference numerals, with the exception of the parts intended to cooperate with the conveyor means of parking areas 104 which are designated by the same reference numerals increased by 100. Furthermore, in order to permit longitudinal displacements of platform 1 along its rails 52 without interference between drums 7 and gear wheels 15 and 115, said gear wheels are located outside of the space occupied by the four conveyor belts 11 and 111, i.e. in positions such that the drums 7 and 8 never come opposite them. It is therefore possible to make gear wheels 15 and 115 of sufficiently large diameter to permit of reducing the diameter of wheels 16 and 116 sufficiently to enable them to move past the inner ends of conveyors 11 and 111 although said conveyor ends are close enough to the corresponding ends of the platform conveyors 6.

The particular arrangement illustrated by Figs. 6 and 7 may be dispensed with by providing other means for connecting together the platform conveyors and the parking area conveyors.

According to the arrangement illustrated by Fig. 8, the shafts of drums 215 and 216 carry, fixed thereon, gear wheels, 217 and 218 respectively, the external diameter of which is smaller than that of drums 215 and 216. An arm 219 pivotable about the shaft of drum 215 carries a toothed pinion 220 which is constantly in mesh with gear wheel 217. By controlling the rotation of arm 219, pinion 220 is brought into mesh with the gear wheel 218, which constitutes a very simple transmission.

According to the construction of Fig. 9, the transmission is obtained by means of friction rollers. Cylinders 221 and 222, either smooth or slightly grooved, are mounted in lieu of toothed wheels 217 and 218 respectively. Two arms 223, oscillable about the shaft of drum 215, carry rubber lined rollers 224 constantly pressed against roller 221 and disposed on either side of the horizontal plane of the axes of the drums. By controlling the rotations of the arms 223 in the respective directions which move them toward each other, the rollers 224 are brought into contact with the cylinder 222 which is thus driven.

According to a known principle, by a suitable choice of the relative diameters and positions of the cylinders and rollers, and account being taken of the friction coefficients, every roller 224 is subjected, for one of the directions of rotation, to a self engagement phenomenon which ensures transmission without slipping whatever be the importance of the tangential effort. However, in order to limit the radial efforts, a speed reducing gear may be provided between cylinder 222 and the shaft of drum 216.

When the ground on which the parking garage is built constitutes a blind alley, it is practically impossible to utilize the whole available area, due to the necessity of turning the cars around so they are not compelled to back out from the garage.

This problem can be solved as follows, as illustrated by Fig. 11. In this case, the parking system includes at least four sections, this term designating the whole of the parking areas with which a platform can cooperate for a given relative position of the carriage supporting said platform. The four sections are distributed in two pairs each of which is to cooperate with the same platform, said pairs being disposed on either side of a central passage or alley. The two sections located at the end of the blind alley do not include conveyors in the portion which constitutes said central passage. An automatic turn-table 230 is disposed at the center of the space thus left free. In countries where motor cars have a left drive, the cars enter on their right hand side, are turned on the turn-table and drive out still on their right hand side. The double way of circulation is therefore in accordance with that complied with in streets and every car can drive out through the proper gate. A vertical light beam shown in plan view by point 231 energizes a photo-electric cell so that when the front of a car arriving into one of the two sectors of the turntable stops said beam, the photoelectric cell causes, by means of an electric motor, a rotation of the turn-table through 180°. Thus the car is both in the good direction and along the correct line. A second car can come onto the turn-table while the first one is leaving. The parking of cars is effected before passage on the turn-table for the right hand sections as considered when entering the central alley, and after passage on the turn-table for the left hand sections.

However it is necessary to consider the case where, one of the ground floor conveyors being in operation, a car happens to run thereon and is dangerously placed into an oblique position when one of its axles is still on an endless belt. In order to obviate this danger, I dispose, as shown by Figs. 10 and 11, on either side of the central alleyway, two endless belts 232 driven at will by the power means of platform 1 when this platform is located opposite said endless belts. But said endless belts 232 are relatively short and in line with each of them there is provided a freely movable endless belt 233. It follows that if a car has both of its wheels on the same side located on one of the freely movable endless belts 233, and the two wheels on the other side located on endless belts 232, the movement of these last mentioned endless belts moves the car which, in turn, moves the freely movable endless belts 233. On the contrary, as soon as a car is entirely carried by endless belts 232, the freely movable endless belts 233 are stopped and permit, without any danger or inconvenience, the passage of cars and of persons.

Finally, when the parking garage includes several elevators disposed in line with one another, it is desirable to be able, at each floor, to pass cars from one section to the contiguous section, so that in case of breakdown of one elevator, it is possible to use that of the contiguous section. On the other hand it is of interest, in order to facilitate circulation in the central alleyway, to avoid any pillars in the middle of said alleyway. Consequently, it is necessary to provide a framework which permits free passage of cars from one section to another, while avoiding the use of big beams which are large and very expensive.

According to the construction of Fig. 12, oblique tie members 234 start on every second floor from pillars 235 which form the shafts of the elevators and lead, two floors below, to the middle point of beams 236 which extend from one elevator shaft to the other. This arrangement makes it possible to have at least one passage in every parking area, one of the cars parked on said area being driven directly to the next section and the other car being able to pass after the conveyor of this parking area has been operated manually so as to bring said car into the line followed by the first one.

Vertical tie rods 237 advantageously support the middle parts of the beams 238 located at intermediate levels between those above mentioned, and vertical tie rods 239, starting from the connections between the oblique tie members 234 and beams 238, advantageously support beams 236, whereby every beam is supported at five points and can be made of relatively light construction.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

This application is a continuation-in-part of my application Ser. No. 500,481, filed April 11, 1955 which has issued as Patent No. 2,791,338.

What I claim is:

1. A garage for parking cars which comprises, in combination, at least two substantially horizontal parking areas located at the same level at a distance from each other, each having a ground level area sufficient for parking at least one car thereon, a normally horizontal rectangular platform movable with respect to said parking areas, said platform having an area sufficient to receive a car entirely thereon, conveyor means mounted on said platform, said conveyor means including two parallel endless belts each running from one of the two longer sides of said platform to the other longer side thereof, each of said conveyor means being capable of supporting two coaxial wheels of a car placed on said platform with its axles parallel to the direction of displacement of said endless belts, said platform being dimensioned to fit between said two parking areas with said platform sides in close juxtaposition with the corresponding edges of said parking areas respectively, means for guiding said platform with respect to said parking areas into its active position where it fits between said parking areas, conveyor means carried by each of said parking areas including two endless belts running to said edge of said parking area at right angles thereto and each in line with one platform endless belt when said platform is located in said active position, a motor carried by said platform, coupling means between said motor and said platform conveyor means, two longitudinal shafts journalled on said platform, close to said edges thereof respectively, a sliding gear supported on each of said last mentioned shafts, coupling means interposed between said motor and each of said sliding gears, a parking area longitudinal shaft journalled on each of said parking areas close to said edge thereof, each of said last mentioned shafts being coupled with said conveyor means of the corresponding parking area, a gear wheel fixed on each of said two last mentioned shafts arranged to mesh with one of said sliding gears, respectively, for one position thereof along its shaft, control means for bringing one of said sliding gears into meshing engagement with the corresponding gear wheel, whereby the conveyor means of either of said parking areas can be coupled with said motor when the platform is in active position, control means for operating said motor, and means, responsive to movements of each of said parking area conveyor means, having its parking area shaft coupled with said motor through the corresponding gear wheel and sliding gear in mesh with each other, for automatically stopping said motor when said last mentioned conveyor means reach at least one predetermined position in the corresponding parking area.

2. A garage according to claim 1 in which said means for coupling each of said sliding gears with said motor include at least one resilient element permitting a slight relative rotation of said sliding gear to facilitate its meshing with the corresponding gear wheel.

3. A garage according to claim 1 in which said sliding gears are located in diagonally opposed positions on said platform.

4. A garage according to claim 1 in which the coupling means between said motor and said platform conveying means are operable for independent driving of the respective endless belts of said platform conveying means.

5. A garage according to claim 1 in which the coupling means between said motor and said platform conveying means include electrically controlled clutch means interposed between said motor and at least one of the endless belts of said platform conveying means.

6. A garage according to claim 1 including at least two parking areas disposed at the same level and end to end in the longitudinal direction, having their respective corresponding endless belts parallel, located in the same plane, and at a distance from one another slightly greater than the maximum length of a car, further including a frame for supporting said platform, said frame being of a length equal to approximately twice that of said platform, said platform being movable longitudinally on said frame so that it can be made to cooperate with either of said two parking areas, power means carried by said platform capable of moving it longitudinally with respect to said frame, and in which said platform includes, on either side, two sliding gears instead of one, said sliding gears being located at the respective ends of said platform, beyond said platform endless belts, the gear wheel of each of said parking areas being located at the end thereof beyond the endless belts of said parking areas, said sliding gears being of sufficiently small diameter to prevent interference thereof with said parking area conveyor means when said platform is moved longitudinally on said supporting frame, said sliding gears being so mounted on said shafts which support them that the sliding displacements of said sliding gears to engage said parking area gear wheels take place in directions away from the center of said platform.

7. A garage for parking cars which comprises, in combination, a plurality of substantially horizontal fixed areas each dimensioned to support at least one car thereon, a normally horizontal rectangular platform movable with respect to said parking areas, said platform having an area sufficient to receive a car entirely thereon, conveyor means mounted on said platform, said conveyor means including at least one endless flexible member running from one of the two longer sides of said platform to the other longer side thereof, said flexible member being movable with respect to said platform in a direction perpendicular to said two sides thereof, said conveyor means being capable of supporting the wheels of a car placed on said platform with its axles at right angles to said sides, means for guiding said platform with respect to said fixed areas into any of a plurality of positions in which one of said sides of said platform is located adjacent to, and on the same level as, one edge of one of said fixed areas respectively, conveyor means carried by each of said fixed areas including at least one endless flexible member extending to said edge of said fixed area and movable in a direction at right angles thereto, said fixed area endless flexible member being in line with said platform endless flexible member when said platform is located adjacent said fixed area, power means carried by said platform for driving the conveyor means thereof, said power means comprising an electric motor, means for coupling the conveyor means of any of said fixed areas with the power means of the platform located adjacent it, control means for operating said power means, a switch carried by said platform and inserted in the electric circuit of said motor, and a part operative by said fixed area endless flexible member for operating said switch to open said electric circuit when the said last mentioned endless flexible member is in a predetermined position with respect to said platform, whereby said motor is automatically switched off when said fixed area conveyor means reach at least one predetermined position in the corresponding fixed area, said platform conveyor means including a cylinder driven by said power means extending along one of said edges of said platform and said fixed area conveyor means including a cylinder extending along the corresponding parking area edge, the means for coupling said fixed area conveyor means with said power means including two rollers each frictionally engaging said first mentioned cylinder tangentially thereto, the axes of said rollers being parallel to the axis of said first mentioned cylinder, arms pivoted about the axis of said first mentioned cylinder for supporting each of said rollers journalled thereon, said arms extending on opposite sides of the plane determined by the respective axes of said two cylinders, and means for urging said two arms at will toward each other.

8. A garage for parking cars which comprises, in combination, a plurality of substantially horizontal fixed areas each dimensioned to support at least one car thereon, a normally horizontal rectangular platform movable with respect to said parking areas, said platform having an area sufficient to receive a car entirely thereon, conveyor means mounted on said platform, said conveyor means including at least one endless flexible member running from one of the two longer sides of said platform to the other longer side thereof, said flexible member being movable with respect to said platform in a direction perpendicular to said two sides thereof, said conveyor means being capable of supporting the wheels of a car placed on said platform with its axles at right angles to said sides, means for guiding said platform with respect to said fixed areas into any of a plurality of positions in which one of said sides of said platform is located adjacent to, and on the same level as, one edge of one of said fixed areas respectively, conveyor means carried by each of said fixed areas including at least one endless flexible member extending to said edge of said fixed area and movable in a direction at right angles thereto, said fixed area endless flexible member being in line with said platform endless flexible member when said platform is located adjacent said fixed area, power means carried by said platform for driving the conveyor means thereof, said power means comprising an electric motor, means for coupling the conveyor means of any of said fixed areas with the power means of the platform located adjacent it, control means for operating said power means, a switch carried by said platform and inserted in the electric circuit of said motor, and a part operative by said fixed area endless flexible member for operating said switch to open said electric circuit when the said last mentioned endless flexible member is in a predetermined position with respect to said platform, whereby said motor is automatically switched off when said fixed area conveyor means reach at least one predetermined position in the corresponding fixed area, said garage having a ground-floor including a central blind alley, a turn-table at the blind end of said alley, said turn-table being adapted to accommodate a car, a track for slidably supporting one platform on either side of said alley and said turn-table, said track being of a length equal to approximately twice that of said platform, two parking fixed areas on the outer side of each of said tracks, and conveyor endless flexible members only in the portions of said alley located opposite the parking areas at the entrance of said alley.

9. A garage according to claim 8 in which said turn-table is adapted to accommodate a car on one half of the surface.

10. A garage for parking cars which comprises, in combination, a plurality of substantially horizontal fixed areas each dimensioned to support at least one car thereon, a normally horizontal rectangular platform movable with respect to said parking areas, said platform having an area sufficient to receive a car entirely thereon, conveyor means mounted on said platform, said conveyor means including at least one endless flexible member running from one of the two longer sides of said platform to the other longer side thereof, said flexible member being movable with respect to said platform in a direction perpendicular to said two sides thereof, said conveyor means being capable of supporting the wheels of a car placed on said platform with its axles at right angles to said sides, means for guiding said platform with respect to said fixed areas into any of a plurality of positions in which one of said sides of said platform is located adjacent to, and on the same level as, one edge of one of said fixed areas respectively, conveyor means carried by each of said fixed areas including at least one endless flexible member extending to said edge of said fixed area and movable in a direction at right angles thereto, said fixed area endless flexible member being in line with said platform endless flexible member when said platform is located adjacent said fixed area, power means carried by said platform for driving the conveyor means thereof, said power means comprising an electric motor, means for coupling the conveyor means of any of said fixed areas with the power means of the platform located adjacent it, control means for operating said power means, a switch carried by said platform and inserted in the electric circuit of said motor, a part operative by said fixed area endless flexible member for operating said switch to open said electric circuit when the said last mentioned endless flexible member is in a predetermined position with respect to said platform, whereby said motor is automatically switched off when said fixed area conveyor means reach at least one predetermined position in the corresponding fixed area and a freely movable endless flexible member carried by at least one of said fixed areas end to end with said endless flexible member of said last mentioned fixed area.

References Cited in the file of this patent

UNITED STATES PATENTS

| | | |
|---|---|---|
| 2,454,101 | Snead | Nov. 16, 1948 |
| 2,569,711 | Foster | Oct. 2, 1951 |
| 2,663,446 | Romain | Dec. 22, 1953 |
| 2,679,941 | Roesies | June 1, 1954 |
| 2,712,875 | Leopold | July 12, 1955 |
| 2,746,616 | Sinclair | May 22, 1956 |
| 2,799,406 | Alimanestiano | July 16, 1957 |

FOREIGN PATENTS

| | | |
|---|---|---|
| 602,179 | France | Apr. 5, 1927 |